United States Patent
Salsone et al.

(10) Patent No.: US 11,305,938 B2
(45) Date of Patent: Apr. 19, 2022

(54) ACTIVE DIRECT DRIVE SPIRAL CONVEYOR BELT SYSTEMS AND METHODS

(71) Applicant: Cambridge International, Inc., Cambridge, MD (US)

(72) Inventors: Frank Salsone, Glen Head, NY (US); Thomas O. Perdue, Salisbury, MD (US); Robert E. Maine, Jr., Salisbury, MD (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 17/004,560

(22) Filed: Aug. 27, 2020

(65) Prior Publication Data

US 2021/0061572 A1 Mar. 4, 2021

Related U.S. Application Data

(60) Provisional application No. 62/893,496, filed on Aug. 29, 2019.

(51) Int. Cl.
  *B65G 15/02* (2006.01)
  *B65G 21/18* (2006.01)
  (Continued)

(52) U.S. Cl.
  CPC ............. *B65G 15/02* (2013.01); *B65G 15/30* (2013.01); *B65G 15/64* (2013.01); *B65G 21/18* (2013.01);
  (Continued)

(58) Field of Classification Search
  CPC ................ B65G 21/18; B65G 2207/24; B65G 2201/02; B65G 17/083; B65G 17/064;
  (Continued)

(56) References Cited

U.S. PATENT DOCUMENTS

| 3,348,659 A | 10/1967 | Roinestad |
| 4,078,655 A | 3/1978 | Roinestad |

(Continued)

FOREIGN PATENT DOCUMENTS

| WO | 9702198 A1 | 1/1997 |

OTHER PUBLICATIONS

Ashworth Bros., Inc., PosiDrive Spiral (TM), Food Engineering Magazine, Oct. 2017, 1 page.
(Continued)

*Primary Examiner* — James R Bidwell
(74) *Attorney, Agent, or Firm* — Quarles & Brady LLP

(57) ABSTRACT

An active drive spiral conveyor belt system includes a drum configured to rotate about a drum axis, a plurality of modules, a plurality of cross-rods joining together the plurality of modules, and an infeed system. The drum can include a plurality of drive bars, each with a drive member extending therefrom, and spaced an arc length. At least some of the plurality of cross-rods or modules can include a drive end configured to engage with the drive members. The plurality of modules can be configured to be collapsible relative to each other and the plurality of cross-rods. The infeed system can be configured to collapse the spacing between adjacent drive ends prior to transiting into engagement with a cooperating drive member.

15 Claims, 5 Drawing Sheets

(51) Int. Cl.
*B65G 15/64* (2006.01)
*B65G 23/06* (2006.01)
*B65G 15/30* (2006.01)

(52) U.S. Cl.
CPC ...... *B65G 23/06* (2013.01); *B65G 2203/0283* (2013.01); *B65G 2203/042* (2013.01); *B65G 2207/24* (2013.01)

(58) Field of Classification Search
CPC .......... B65G 23/44; B65G 1/02; B65G 35/06; B65G 15/30; B65G 2203/0283; B65G 23/06; B65G 2203/042; B65G 15/64; B65G 15/02
USPC .......................................................... 198/778
See application file for complete search history.

(56) References Cited

U.S. PATENT DOCUMENTS

| | | | |
|---|---|---|---|
| 4,450,953 A | | 5/1984 | Le Cann et al. |
| 4,464,654 A | | 8/1984 | Klein |
| 4,741,430 A | | 5/1988 | Roinestad |
| 4,852,720 A | * | 8/1989 | Roinestad .............. B65G 21/18 198/778 |
| 4,858,750 A | | 8/1989 | Cawley |
| 4,941,566 A | | 7/1990 | Irwin |
| 4,944,162 A | | 7/1990 | Lang et al. |
| 4,981,208 A | | 1/1991 | Jones |
| 5,133,449 A | | 7/1992 | Spangler |
| 5,139,135 A | | 8/1992 | Irwin et al. |
| 5,141,099 A | | 8/1992 | Baumgartner |
| 5,191,267 A | | 3/1993 | Machacek |
| 5,247,810 A | * | 9/1993 | Fenty .................. B65G 17/064 198/778 |
| 5,310,045 A | | 5/1994 | Palmaer et al. |
| 5,318,169 A | | 6/1994 | Faulkner et al. |
| 5,346,059 A | | 9/1994 | Irwin |
| 5,358,096 A | | 10/1994 | Faulkner et al. |
| 5,431,275 A | | 7/1995 | Faulkner |
| 5,460,260 A | | 10/1995 | Ochs et al. |
| 5,566,817 A | | 10/1996 | Meeker |
| 5,775,480 A | | 7/1998 | Lapeyre et al. |
| 5,954,187 A | | 9/1999 | Hager |
| 6,129,205 A | | 10/2000 | Ergenbright et al. |
| 6,260,688 B1 | * | 7/2001 | Steeber .................. B65G 21/18 198/347.4 |
| 6,484,379 B2 | | 11/2002 | Palmaer |
| 6,564,930 B1 | | 5/2003 | Colding-Kristensen et al. |
| 6,578,704 B1 | | 6/2003 | MacLachlan |
| 6,796,418 B1 | | 9/2004 | Harrison et al. |
| 6,837,367 B1 | | 1/2005 | Klein et al. |
| 7,070,043 B1 | | 7/2006 | MacLachlan et al. |
| 7,410,047 B2 | | 8/2008 | van Faassen |
| 7,735,637 B2 | | 6/2010 | Montgomery et al. |
| 7,762,388 B2 | | 7/2010 | Lago |
| 7,779,994 B1 | | 8/2010 | Travis |
| 7,971,707 B2 | | 7/2011 | Elsner |
| 7,987,974 B2 | | 8/2011 | Montgomery et al. |
| 8,047,356 B2 | | 11/2011 | Elsner |
| 8,181,771 B2 | | 5/2012 | Talsma |
| 8,302,764 B2 | | 11/2012 | Johnson |
| 8,522,960 B2 | | 9/2013 | Johnson |
| 8,618,929 B2 | | 12/2013 | Ganapathy et al. |
| 8,678,178 B2 | | 3/2014 | Bickel, Jr. et al. |
| 8,752,698 B2 | | 6/2014 | Lasecki et al. |
| 8,844,713 B2 | | 9/2014 | Lasecki |
| 8,857,607 B2 | | 10/2014 | Lasecki et al. |
| 8,857,608 B2 | | 10/2014 | Lackner et al. |
| 8,899,409 B2 | | 12/2014 | Lasecki |
| 8,985,318 B2 | | 3/2015 | Neely |
| 9,061,829 B2 | | 6/2015 | Salsone et al. |
| 9,079,719 B2 | | 7/2015 | Talsma et al. |
| 9,096,380 B2 | | 8/2015 | Lasecki et al. |
| 9,150,359 B2 | | 10/2015 | Lasecki et al. |
| 9,377,151 B2 | | 6/2016 | Jensen |
| 9,394,109 B2 | | 7/2016 | Talsma et al. |
| 9,481,523 B2 | | 11/2016 | Talsma et al. |
| 9,527,673 B2 | | 12/2016 | Bogle et al. |
| 9,688,480 B2 | | 6/2017 | Ulchak et al. |
| 9,708,126 B2 | | 7/2017 | Bogle |
| 9,815,630 B1 | | 11/2017 | Coto |
| 9,884,723 B2 | | 2/2018 | Neely et al. |
| 10,023,388 B2 | | 7/2018 | Talsma et al. |
| 10,189,645 B2 | | 1/2019 | Talsma et al. |
| 10,280,004 B2 | | 5/2019 | Perdue et al. |
| 10,364,101 B2 | | 7/2019 | Neely et al. |
| 10,501,265 B2 | | 12/2019 | Talsma et al. |
| 2003/0051979 A1 | | 3/2003 | Travis |
| 2005/0109581 A1 | * | 5/2005 | Roland .................. B65G 21/18 198/778 |
| 2006/0249359 A1 | | 11/2006 | Pasch |
| 2007/0102264 A1 | | 5/2007 | Wallace et al. |
| 2007/0175736 A1 | | 8/2007 | Bickel et al. |
| 2008/0023304 A1 | | 1/2008 | Elsner |
| 2011/0056806 A1 | | 3/2011 | Johnson |
| 2011/0132724 A1 | | 6/2011 | Buchkremer |
| 2011/0137613 A1 | | 6/2011 | Sakaguchi |
| 2012/0006654 A1 | | 1/2012 | Talsma |
| 2012/0168281 A1 | | 7/2012 | Twigger et al. |
| 2012/0217132 A1 | | 8/2012 | Twigger et al. |
| 2013/0118867 A1 | | 5/2013 | Salsone et al. |
| 2013/0213773 A1 | | 8/2013 | Talsma et al. |
| 2015/0353285 A1 | | 12/2015 | Matsuzaki et al. |
| 2017/0022012 A1 | | 1/2017 | Neely et al. |
| 2019/0016535 A1 | | 1/2019 | Elsner et al. |

OTHER PUBLICATIONS

PCT International Search Report and Written Opinion, PCT/US2020/048156, dated Dec. 4, 2020, 8 pages.

* cited by examiner

ACTIVE DIRECT DRIVE SPIRAL CONVEYOR BELT SYSTEMS AND METHODS

CROSS-REFERENCE TO RELATED APPLICATION

This application claims priority under 35 U.S.C. § 119 to U.S. Provisional Patent Application No. 62/893,496 filed on Aug. 29, 2019, the entire contents of which are incorporated herein by reference.

STATEMENT CONCERNING FEDERALLY SPONSORED RESEARCH AND DEVELOPMENT

Not applicable.

TECHNICAL FIELD

The present disclosure is described in the context of spiral conveyor belt systems and methods. More specifically, the present disclosure relates to direct drive spiral conveyor belts configured to transition between a linear portion and a direct drive spiral portion.

BACKGROUND

Spiral conveyor belt systems are designed to provide a large amount of belt carry surface within a relatively small footprint, such as on a manufacturing plant floor. This makes spiral conveyor belt systems well suited for applications, such as freezing, cooling, proofing, cooking, etc. Many spiral conveyor belt systems incorporate a "low-tension" frictional drive that utilizes a rotating drum composed of multiple vertical uprights. The vertical uprights of the rotating drum drive the belt forward by imparting a friction and traction force against the inside belt edge as the drum rotates, thereby driving the belt forward and along the vertical helix of the spiral conveyor belt system. Such systems, however, also impart a high tension throughout the belt, which can contribute to a reduced service life of the belt.

Other spiral conveyor belt systems incorporate a direct drive. A direct drive arrangement utilizes a positive engagement between a belt drive feature often positioned near the inside belt edge (e.g., formed ends of an exposed cross-rod/pin of the belt) and drive members of the drum that are often positioned along the vertical uprights (e.g., vertical ribs included on caps that attach to select vertical uprights). Although this type of system generally lowers overall belt tension once the belt is fully engaged, the initial engagement between the belt and the drive members can be challenging to achieve in consistent, efficient, and structurally sound manners. For instance, controlling and/or accounting for the interaction between the variable pitch of a conveyor belt (e.g., the dynamic distance between belt drive features) as it begins to collapse and fully engage with the spaced drive members (e.g., vertical ribs) of the rotating drum presents unique challenges, including aspects of maintaining desired tension in the belt as it engages, rides along, and disengages the drive members. In addition, variations in belt properties and dimensions (e.g., such as a result of wear and environmental influence) introduce additional considerations to address, particularly to the initial engagement between the belt and the drive members in either an up-go spiral or a down-go spiral.

Therefore, a need exists for improved spiral conveyor belt systems and methods that maintain and enhance the conventional features and benefits, while addressing various deficiencies associated with the interaction between the belt and the drive members during transition between linear and spiral portions of a direct drive spiral conveyor belt system.

SUMMARY

In one embodiment, an active drive conveyor belt system includes a drum configured to rotate about a drum axis, a plurality of modules, a plurality of cross-rods joining together the plurality of modules, and an infeed system. The drum can include a plurality of drive bars, each with a drive member extending therefrom, and spaced an arc length. At least some of the plurality of cross-rods and/or modules can include a drive end configured to engage with the drive members. The plurality of modules can be configured to be collapsible relative to each other and the plurality of cross-rods. The infeed system can be configured to collapse the spacing between adjacent drive ends prior to transiting into engagement with a cooperating drive member.

BRIEF DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

DETAILED DESCRIPTION

Figure 1:
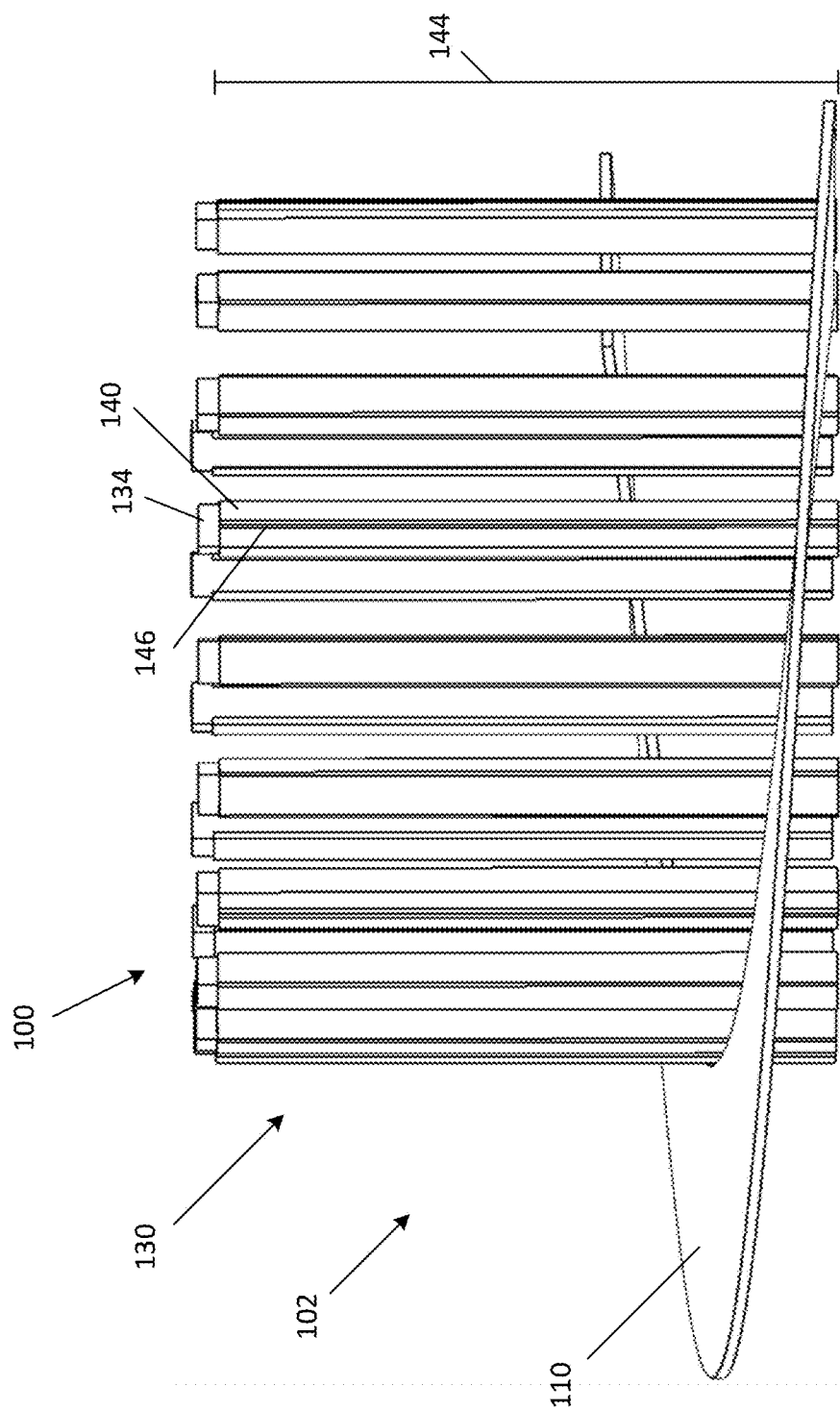
FIG. 1 is a simplified side elevation view of an example direct drive spiral conveyor belt system in accordance with an embodiment.
Figure 2:
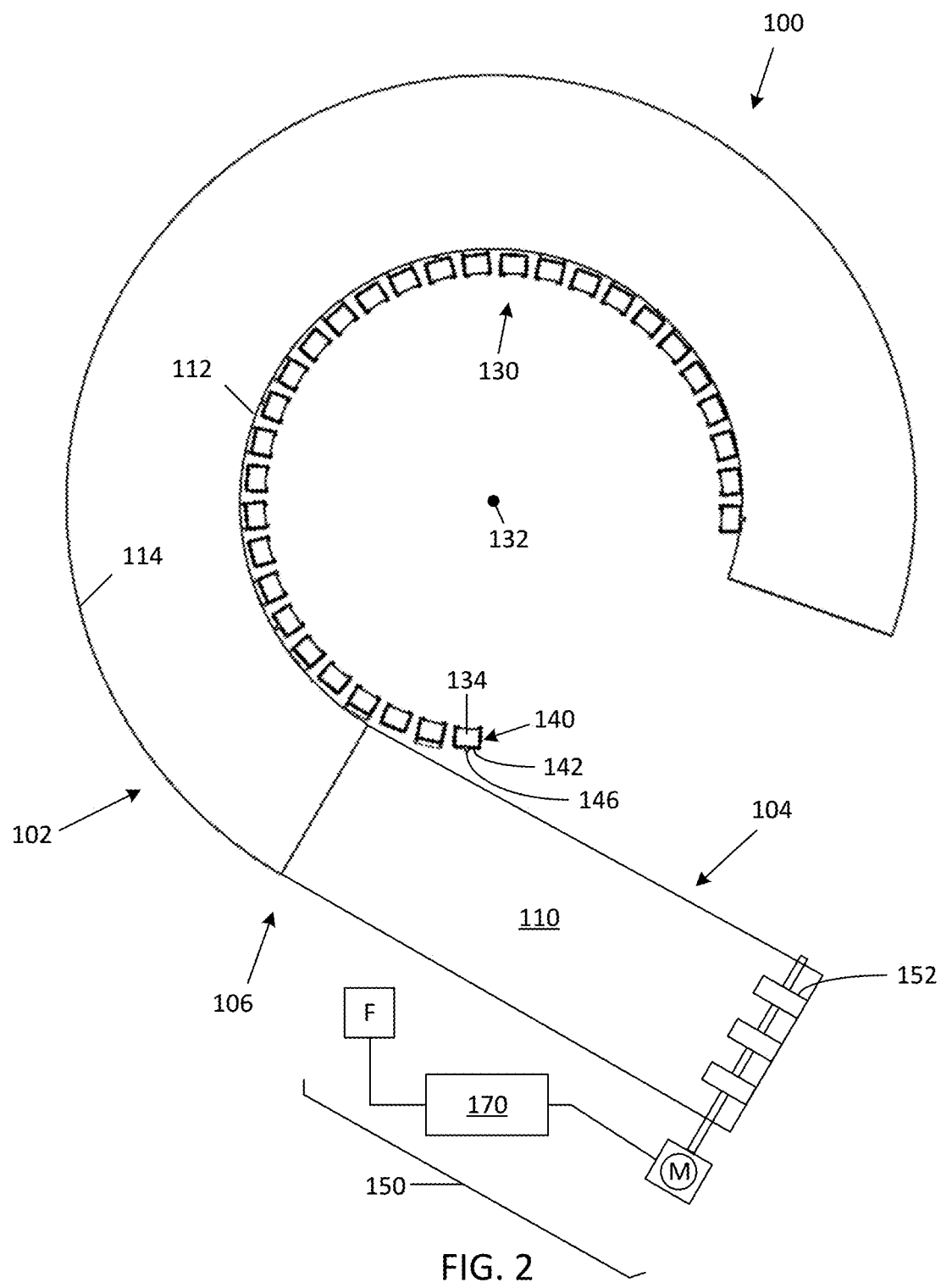
FIG. 2 is a top plan view of the example direct drive spiral conveyor belt system shown in FIG. 1 with an attached linear segment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art and the underlying principles herein can be applied to other embodiments and applications without departing from embodiments of the invention. Thus, embodiments of the invention are not intended to be limited to embodiments shown, but are to be accorded the widest scope consistent with the principles and features disclosed herein.

Some of the discussion below describes direct drive spiral conveyor belt systems that can be incorporated into new and/or retrofit into existing direct drive spiral conveyor belt system arrangements. The context and particulars of this discussion are presented as examples only. For instance, embodiments of the disclosed invention can be configured in various ways, including other shapes and arrangements of elements. Similarly, embodiments of the invention can be used with other types of conveyor belts or assemblies (e.g., metal mesh, modular plastic, etc.) in addition to those expressly illustrated or described herein and, for instance, may be incorporated into an up-go and/or down-go conveyor system.

A conveyor belt is typically an endless belt driven in a direction of travel. In instances where a large amount of belt carry surface within a relatively small footprint is desired, for instance, on a manufacturing plant floor supporting applications, such as freezing, cooling, proofing, cooking, etc., spiral conveyor belt systems are well suited. In a conveyor belt arrangement incorporating a direct drive spiral conveyor belt system, the conveyor belt includes a generally linear segment that merges (e.g., somewhat tangentially) along a transitional zone with a generally helical spiral segment to achieve positive engagement between a belt drive feature often located near the inside edge of the belt and a cooperating drive member rotating with the drum.

A simplified depiction of a portion of an example direct drive spiral conveyor belt system 100 is shown and described with reference to FIGS. 1-4. In addition to having a belt 110, the example direct drive spiral conveyor belt system 100 has a plurality of vertical bars 134 that generally form a drum 130, which rotates about a drum axis 132 (shown in FIGS. 1 and 2). The rotation of the drum 130 can be implemented via conventional means, such as one or more electric motors, power transmissions, and controllers.

Figure 3:
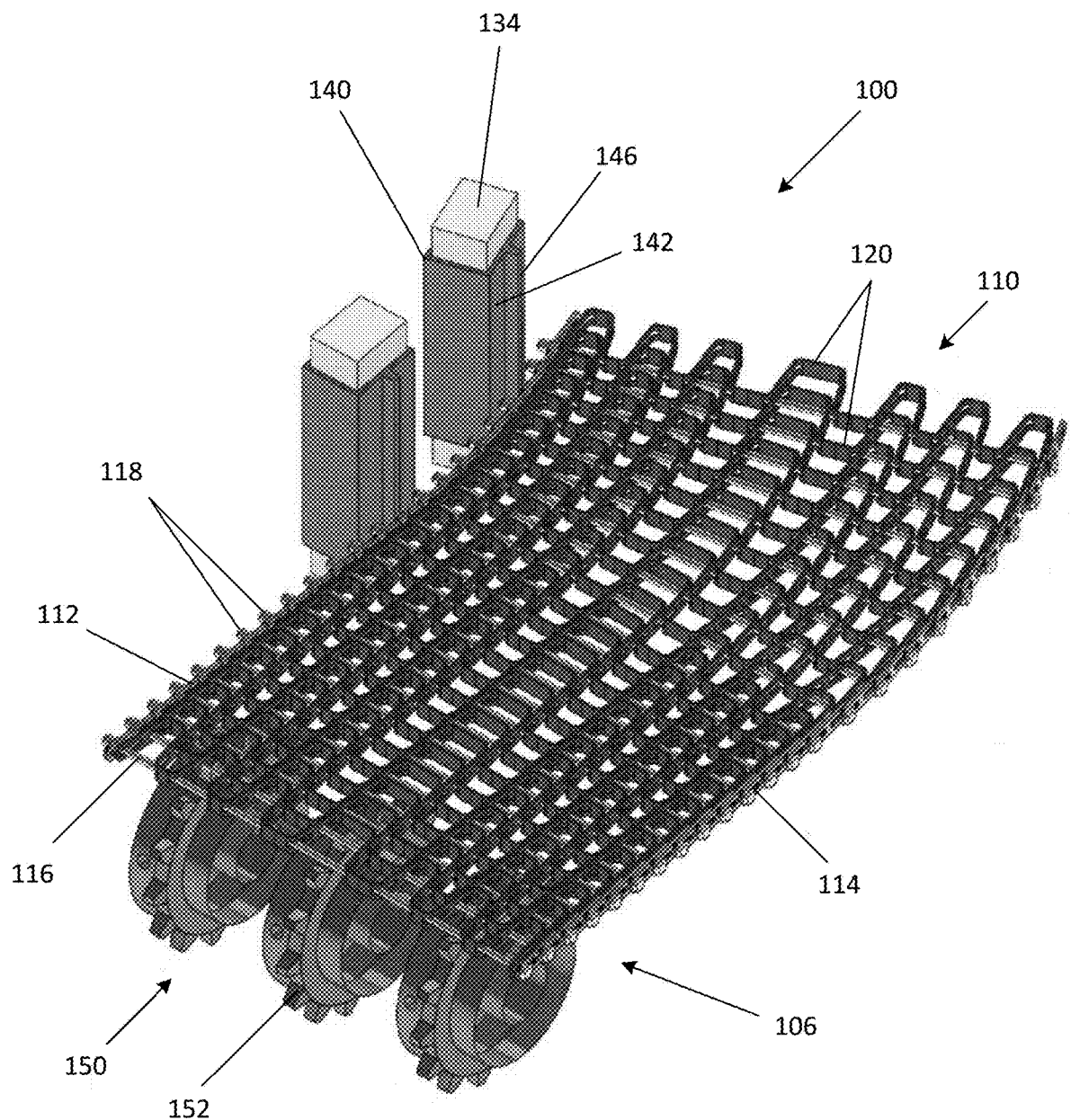
FIG. 3 is a more detailed isometric view of a section of another example of a direct drive spiral conveyor belt system in accordance with an embodiment.
Figure 4:
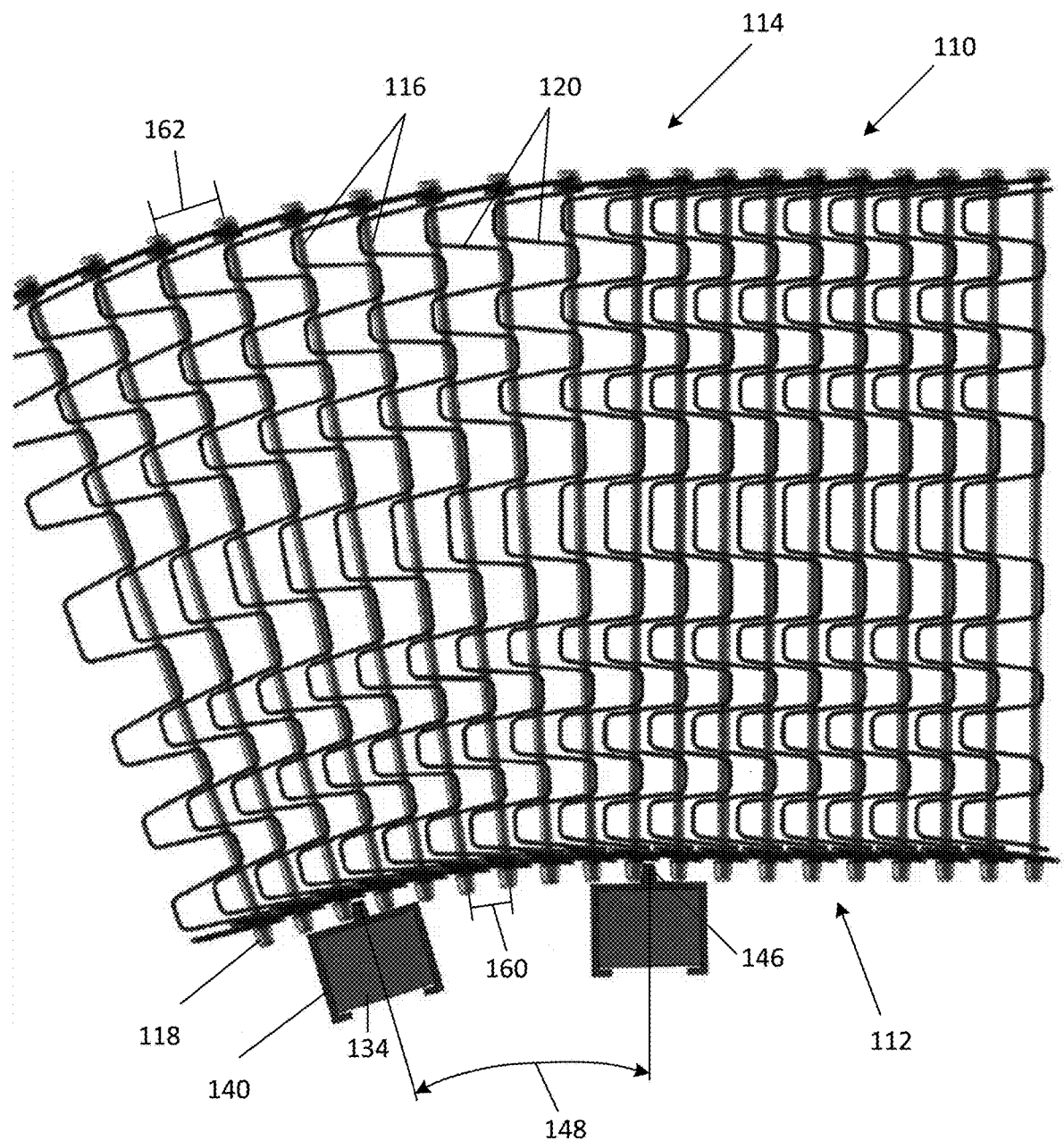
FIG. 4 is a top plan view of a portion of the direct drive spiral conveyor belt system shown in FIG. 3.

The belt 110 can have a plurality of modules, shown in one embodiment as rows of pickets 120, interconnected by a plurality of cross-rods 116. Each of the plurality of pickets 120 is slidable relative to each other and the respective cross-rods 116 allowing the spacing of the plurality of pickets 120 and the interconnecting cross-rods 116 to compress and expand. For example, as the belt 110 traverses a generally helical spiral segment 102, the plurality of pickets 120 can compress together along an inside portion 112 and expand away from each other along an outside portion 114. In some embodiments, each of the cross-rods 116 can have a drive end 118 on the end nearest the inside portion 112, as shown in FIGS. 3 and 4. The number, pattern, spacing, and form factor of the drive ends 118 can be adapted to accommodate application-specific designs and requirements, such as load carrying capacity and cost targets. In other forms, the drive ends can be separate and independent from the cross-rods (e.g., integrally molded with a plastic module).

As shown, a first number of the plurality of vertical bars 134 may have a drive cap 140 attached thereto (e.g., clipped, adhered, bolted, etc.) (shown best in FIG. 3). The drive cap 140 can have a planar portion 142 along a length 144 of the drive cap 140. The example drive cap 140 defines a drive member in the form of a rib 146. The example rib 146 extends away from the planar portion 142 and may extend along the entire length 144 of the drive cap 140. The drive member may comprise various other form factors configured to mate with and establish positive engagement with a cooperating belt drive feature formed, for example, on at least a portion of the inner edge of the belt 110.

The ratio and pattern of vertical bars 134 about the drum 130 having drive members (e.g., ribs 146) can be adapted to address application-specific requirements (e.g., based on dimensions of the drum 130, load capacity specifications, throughput and velocity specifications, etc.). In some examples, drive caps 140 with ribs 146 are provided on consecutive vertical bars 134 (shown in FIGS. 3 and 4).

The example ribs 146 on the drive cap 140 may be integrally formed with the planar portion 142 and configured to, for instance, contact and engage with drive ends 118 of one of the cross-rods 116 on the inside edge of the example belt 110 (shown in FIGS. 3 and 4). As the drum 130 and the vertical bars 134 rotate about the drum axis 132, the drive caps 140 ultimately engage and drive the belt 110 along the conveyor belt system 100.

An infeed system 150 is preferably provided in a transitional zone 106 in which the conveyor belt 110 transitions from the linear segment 104 to the helical spiral segment 102, or vice versa. The infeed system 150 can include a motor M (e.g., a variable speed electric motor) and one or more sprockets 152 that engage the cross-rods 116 from beneath the belt 110. The belt 110 can be actively over-driven within the transitional zone 106 by the infeed system 150 to cause sequential pickets 120 of the belt 110 to at least partially collapse (i.e., compress) together prior to reaching the helical spiral segment 102 and before the drive caps 140 on the vertical bars 134 engage the drive ends 118 of the cross-rods 116. As the belt 110 moves upward (or downward) through the helical spiral segment 102, the drive ends 118 of the cross-rods 116 can engage with the ribs 146 on the drive caps 140 while the pickets 120 of the belt 110 are at least partially collapsed together.

The belt 110 is dynamically/actively over-driven when the velocity of the belt 110 within the transitional zone 106 is relatively greater than the velocity of the belt 110 that has transitioned generally into the helical spiral segment 102. In the example embodiment, this relative velocity difference is achieved as a result of the operational differences between the belt velocity allowed by the rotating drum 130 (and the associated drum drive system) and the belt velocity allowed by the infeed system 150 (and the associated motor M). In this arrangement, the combined over-drive and downstream backpressure results in the momentary collapse of sequential pitches of the belt 110 within the transitional zone 106. In other embodiments, this momentary collapsing may be achieved by other techniques that establish a velocity difference between the belt 110 in the relevant operational segments.

The distance between adjacent drive ends 118 after leaving the transitional zone 106 defines a substantially arcuate drive-end distance 160. The extent to which the pickets 120 and the cross-rods 116 of the belt 110 are collapsed by the infeed system 150 is, in some embodiments, preferably a whole-number factor of the rib arc length 148 between adjacent ribs 146 to maximize cooperation between available drive ends 118 and ribs 146. The amount of collapse effectuated can vary from none to full collapse, depending on application-specific requirements, such as desired belt tension, belt width, drum diameter, load-carrying requirements and the like.

The drive-end distance 160 also directly corresponds to the amount of edge tension within the belt 110, which, depending on the application-specific requirements (e.g., load rating on the belt 110, radius of the helical spiral segment 102, width of the belt 110, conveyor speed, etc.), more or less tension may be preferred. The drive-end distance 160 can be adjusted to match the desired belt tension. One example includes varying the rib arc length 148 between the ribs 146 and/or the placement of drive ends 118. Another example includes varying the amount the belt 110 is over-driven by the infeed system 150 and thus the amount the belt 110 is collapsed between pickets 120 and the cross-rods 116.

As the belt 110 traverses the helical spiral segment 102, the drive-end distance 160 between adjacent drive ends 118 at the inside portion 112 of the belt 110 is mostly maintained, while the distance between the cross-rods 116 at the outside portion 114 is generally the distance between adjacent cross-rods 116 in the belt 110 in a fully-extended state (uncollapsed distance 162) because typically some tension in the outside portion 114 of the belt 110 is preferable to maintain the contact between the drive ends 118 and the ribs 146. The smaller the drive-end distance 160 is relative to the uncollapsed distance 162, the more the belt 110 is inherently curved and the less tension is induced into the belt 110 at the outside portion 114 as it traverses the helical spiral segment 102.

As explained herein, a unique auxiliary belt drive is disclosed that achieves a properly functioning direct drive spiral conveyor by utilizing an active engagement system between the belt and the rotating drum. Instead of using a passive system that relies on the inside belt edges gradually engaging the vertical ridges through a decreasing inside drum radius, the belt is positively over-driven at the infeed section to cause sequential pitches/modules/rows of belt to momentarily collapse on the conveyor just prior to reaching the tangential engagement point with the rotating drum. As the belt gradually moves upward (or downward) through the spiral helix, the inside edge of the belt engages with vertical drive ridges while the belt is still in its partially collapsed state. The extent that the belt is collapsed ultimately influences the edge tension carried by the belt throughout the remainder of the spiral stack. Some tension on the outer edge of the belt may persist in order to maintain contact between the inside belt edge and the rotating drum that propels the belt (and product load) forward. In some embodiments, the amount of overdrive of this belt section can be varied in order to adjust the amount of belt that collects within this location. In this way, the amount of "excess belt" that is captured between the positive engagement points on the rotating drum can be varied to match the desired belt tension setting on the spiral conveyor overall. This active direct drive system concept is relatively efficient to install and maintain, and can provide a convenient retrofit option for existing low-tension systems, such as during a belt change-out. The system is also capable of operating on either an up-go spiral or a down-go spiral conveyor.

It is further contemplated that there may be a feedback control system 170 (FIG. 2) configured to maintain the desired engagement relationship (e.g., between the ribs 146 and the drive ends 118) that can be, for example, correlated to the drive-end distance 160. The feedback control system 170 can include a feedback device F, such as sensors, strain gauges, optical sensors, and other belt monitoring equipment to monitor the engagement relationship (e.g., via the drive-end distance 160 upon entering or exiting the infeed system 150). This engagement relationship may also be monitored, for instance, via an optical device that provides driving engagement data (e.g., percentage of drive ends 118 being engaged by ribs 146) and/or via a strain gauge that provides general belt tension data (e.g., tension along the inside/outside/middle of the belt, the linear segment 104, the transitional zone 106, and/or the helical spiral segment 102). The feedback control system 170 can provide indications (e.g., audio, visual, and/or electronic text notifications) to an operator if the measured values are outside of the predetermined parameters. In one example embodiment, the infeed system 150 and the feedback control system 170 can include two synchronized motor drives (e.g., motor M and a separate motor configured to drive rotation of the drum 130), each motor drive can include an encoder and be configured to establish and maintain a desired over-drive and prescribed collapse of the belt 110. In one form, the motors are synchronized to collapse the belt 110 a prescribed amount by advancing a metered amount of belt 110 from, for instance, a take-up/slack loop assembly as the drum 130 rotates at a substantially fixed velocity. The feedback control system 170 can also make dynamic, near real-time adjustments to the infeed system 150 as necessary to maintain a predetermined parameter, such as drive-end distance 160, including adjusting the speed of the motor M (and/or of the drum 130) or upon command if an adjustment to the engagement relationships (e.g., drive-end distance 160) is desired. In some embodiments, the feedback control system 170 can include sensors (e.g., inductive sensors) configured to move (e.g., translate) in concert with the take-up/slack loop assembly, such as inductive sensors positioned on an adjustable take-up belt loop assembly wherein the position of the assembly is indicative of the relative tension. The example inductive sensors can comprise a high sensor and a low sensor positioned to sense the dynamic relative proximity to a fixed high-side reference member and a fixed low-side reference member positioned/spaced to establish acceptable over-drive variation, such that changes in belt tension (e.g., due to temperature and/or wear effects on belt properties) can be inferred within the take-up/slack loop and thus inform appropriate alterations to the relative motor controls (e.g., adjusting the speed of motor M to increase or decrease belt collapse and the associated system properties). Given the benefit of this disclosure, one skilled in the art will appreciate the variety of application-specific infeed system and feedback control system configurations available.

Figure 5:
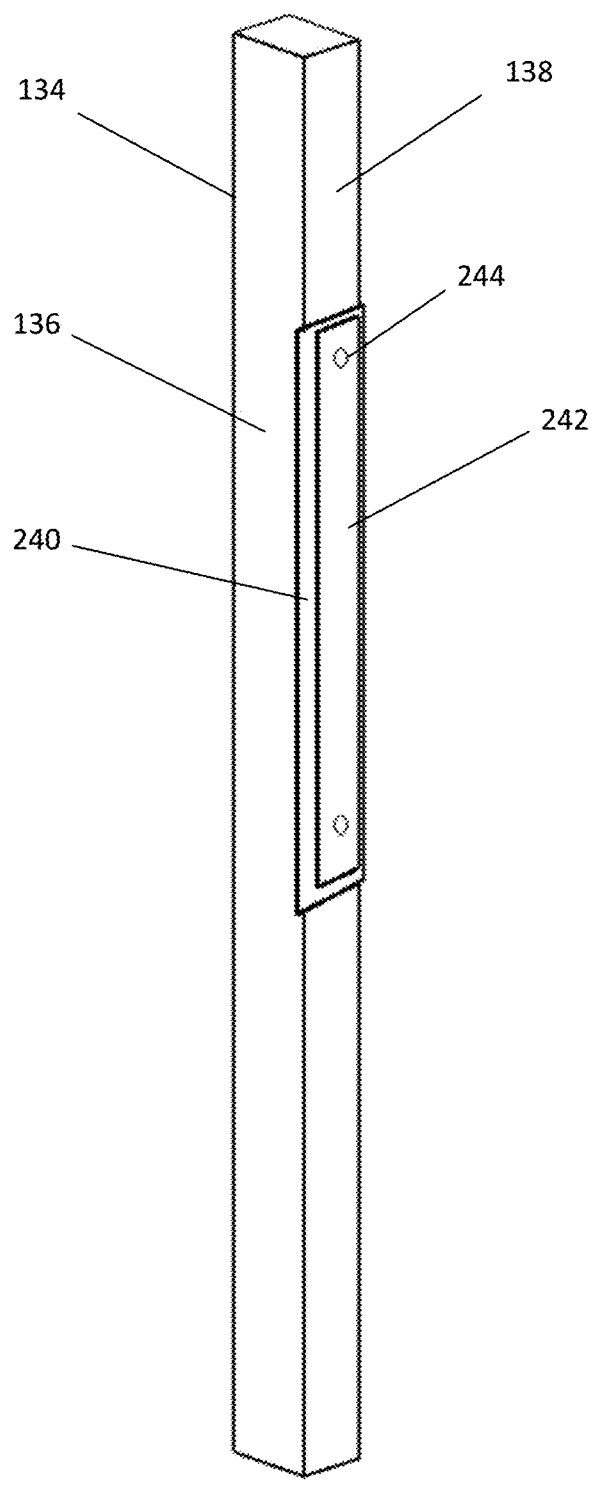
FIG. 5 is an isometric view of a drive rib plate attached to a vertical bar in accordance with an embodiment.

Additionally, or alternatively, as shown in FIG. 5, a drive rib plate 240 can be attached to a side 138 of the vertical bar 134 (e.g., clipped, adhered, bolted, etc.). In FIG. 5, the drive rib plate 240 extends outward past the radially outward face 136 of the vertical bar 134 to engage with the drive ends 118 of the cross-rods 116. The example drive rib plate 240 is sandwiched between a plate 242 and the vertical bar 134 with at least one fastener, here shown as a bolt 244, securing the plate 242 and the drive rib plate 240 thereto. The drive rib plate 240 can be secured to either the leading side or the trailing side of the vertical bar 134 or a set of drive rib plates 240 can be secured to each of the leading and trailing sides of the vertical bar 134. The drive rib plate 240 can, for instance, be formed from nylon and is configured to be conveniently removable and replaceable by removing/replacing the plate 242, which can be made of a stainless steel material. In some embodiments, the vertical bar 134 may include a drive cap (similar to the ribless drive caps 140 shown in FIG. 1) that is made of an ultra-high molecular weight plastic.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. For example, the spacing, size, gauge, form-factor, and other features may vary based on application-specific requirements (e.g., product to be conveyed, environmental factors, speed of conveyance, operational envelope limitations, etc.). In addition, while the embodiments have been described in context of a metallic construction, it is contemplated that other materials (e.g., polymers) or composite constructions (e.g., a metallic base with a plastic overmold) are possible. Other types of conveyor belt systems (e.g., plastic modular conveyors) may also benefit from the incorporation of aspects of the invention.

Various features and advantages of the invention are set forth in the following claims.

The invention claimed is:

1. An active direct drive spiral conveyor belt system comprising:
   a drum configured to rotate about a drum axis, the drum including a plurality of drive bars, each with a drive member extending therefrom and spaced an arc length;
   a plurality of modules;
   a plurality of cross-rods joining together the plurality of modules, at least some of the plurality of cross-rods having a drive end configured to engage with the drive members;
   the plurality of modules configured to be collapsible relative to each other and the plurality of cross-rods;
   an infeed system configured to set a drive-end distance between adjacent drive ends by over-driving the plurality of modules relative to the drum to at least partially collapse adjacent modules of the plurality of modules; and
   a feedback control system configured to monitor the drive-end distance and control the infeed system to adjust the over-driving of the plurality of modules.

2. The active direct drive spiral conveyor belt system of claim 1, wherein the drive member is a rib provided along the length of a drive cap removably received around the drive bar.

3. The active direct drive spiral conveyor belt system of claim 1, wherein the drive member is a drive rib plate secured to a side of the drive bar and extends outward past a front face of the drive bar.

4. The active direct drive spiral conveyor belt system of claim 1, wherein the drive-end distance is a whole-number factor of the arc length.

5. An active direct drive spiral conveyor belt system comprising:
   a drum including adjacent drive members spaced apart an arc length;
   a plurality of modules collapsible relative to an adjacent one of the plurality of modules, at least some of the plurality of modules including drive ends configured to engage with the drive members;
   an infeed system configured to control a drive-end distance between adjacent drive ends and the number of drive ends positioned between the adjacent drive members within the arc length; and
   a feedback control system configured to monitor the drive-end distance and control the infeed system to dynamically adjust the drive-end distance and the number of drive ends positioned between the adjacent drive members within the arc length.

6. The active direct drive spiral conveyor belt system of claim 5, wherein the drive-end distance is a whole-number factor of the arc length.

7. The active direct drive spiral conveyor belt system of claim 5, wherein the drive member is a drive rib plate secured to a side of a drive bar of the drum and extends outward past a front face of the drive bar.

8. The active direct drive spiral conveyor belt system of claim 5, wherein the infeed system is configured to over-drive the plurality of modules relative to the drum to at least partially collapse the plurality of modules within the arc length.

9. The active direct drive spiral conveyor belt system of claim 5, further comprising:
   a linear segment;
   a helical spiral segment;
   a transitional zone between the linear segment and the helical spiral segment; and
   a motor engaged with the plurality of modules to establish a velocity of modules of the plurality of modules passing through at least one of the linear segment and the transitional zone;
   wherein the feedback control system includes a sensor configured to monitor a present drive-end distance between adjacent drive ends; and
   wherein the infeed system is further configured to dynamically control a future drive-end distance by controlling the motor to control the velocity of the modules of the plurality of modules passing through the at least one of the linear segment and the transitional zone.

10. A method of operating an active direct drive spiral conveyor belt system having a collapsible conveyor belt with a plurality of drive ends and a rotating drum comprising a plurality of drive members, the conveyor system defining a transitional zone between a linear segment and a helical spiral segment, the method comprising:
    adjusting the distance between the drive ends within the transitional zone prior to engagement with the drive members to establish a drive-end distance;
    engaging the drive ends with the drive members proximate the helical spiral segment;
    providing an infeed system within the linear segment;
    providing a feedback device;
    monitoring the feedback device to determine a present drive-end distance between adjacent drive ends within the transitional zone; and
    adjusting dynamically operation of the infeed system to alter the distance between drive ends to establish a future drive-end distance between adjacent drive ends that is different from the present drive-end distance.

11. The method of operating the active direct drive spiral conveyor belt system of claim 10, wherein adjusting the drive-end distance comprises over-driving the collapsible conveyor belt relative to the rotating drum within the transitional zone.

12. The method of operating the active direct drive spiral conveyor belt system of claim 10, wherein adjusting the drive-end distance comprises reducing a drive-end distance between sequential pickets of the collapsible conveyor belt by at least partially collapsing the sequential pickets together prior to reaching the helical spiral segment.

13. The method of operating the active direct drive spiral conveyor belt system of claim 10, wherein the providing the feedback device comprises providing at least one of an optical sensor, a strain gauge, and an inductive sensor.

14. An active direct drive spiral conveyor belt system comprising:
- a drum including adjacent drive members spaced apart an arc length;
- a plurality of modules collapsible relative to an adjacent one of the plurality of modules, at least some of the plurality of modules including drive ends configured to engage with the drive members;
- an infeed system configured to control a drive-end distance between adjacent drive ends and the number of drive ends positioned between the adjacent drive members within the arc length;
- a linear segment;
- a helical spiral segment;
- a transitional zone between the linear segment and the helical spiral segment;
- a motor engaged with the plurality of modules to establish a velocity of modules of the plurality of modules passing through at least one of the linear segment and the transitional zone; and
- a feedback device configured to monitor a present drive-end distance between adjacent drive ends;
- wherein the infeed system is further configured to dynamically control a future drive-end distance by controlling the motor to control the velocity of the modules of the plurality of modules passing through the at least one of the linear segment and the transitional zone.

15. The active direct drive spiral conveyor belt system of claim 14, wherein the feedback device comprises at least one of an optical sensor, a strain gauge, and an inductive sensor.

* * * * *